(12) United States Patent
Ortwein

(10) Patent No.: US 9,441,659 B2
(45) Date of Patent: Sep. 13, 2016

(54) FASTENER

(75) Inventor: Friederike Ortwein, Ebersbach (DE)

(73) Assignee: GLABETE GMBH, Ebersbach/Fils (DE)

( * ) Notice: Subject to any disclaimer, the term of this patent is extended or adjusted under 35 U.S.C. 154(b) by 354 days.

(21) Appl. No.: 13/997,467

(22) PCT Filed: Dec. 6, 2011

(86) PCT No.: PCT/EP2011/071826
§ 371 (c)(1),
(2), (4) Date: Jun. 24, 2013

(87) PCT Pub. No.: WO2012/084476
PCT Pub. Date: Jun. 28, 2012

(65) Prior Publication Data
US 2013/0272775 A1    Oct. 17, 2013

(30) Foreign Application Priority Data
Dec. 24, 2010   (DE) ...................... 10 2010 056 221

(51) Int. Cl.
*F16B 11/00* (2006.01)
*F16B 47/00* (2006.01)
*F16C 11/04* (2006.01)

(52) U.S. Cl.
CPC ........... *F16B 11/006* (2013.01); *F16B 47/003* (2013.01); *F16C 11/04* (2013.01); *Y10T 403/32114* (2015.01); *Y10T 403/47* (2015.01)

(58) Field of Classification Search
CPC ..... B29C 65/484; B29C 65/54; F16B 11/00; F16B 11/006; F16B 47/00; F16B 47/003
See application file for complete search history.

(56) References Cited

U.S. PATENT DOCUMENTS

| | | | | |
|---|---|---|---|---|
| 3,239,178 | A | * | 3/1966 | Pompa ...................... 248/205.3 |
| 5,065,489 | A | * | 11/1991 | Mullen et al. ............... 29/281.5 |
| 5,593,120 | A | * | 1/1997 | Hamerski .................. 248/205.3 |
| 7,207,543 | B2 | * | 4/2007 | Ortwein ....................... 248/467 |
| 7,833,620 | B2 | * | 11/2010 | Enserink et al. .......... 428/321.1 |

(Continued)

FOREIGN PATENT DOCUMENTS

| | | | | |
|---|---|---|---|---|
| DE | 44 16 884 | | * 11/1995 | .......... H01L 31/042 |
| DE | 101 20 388 | | * 10/2001 | ............. F16B 37/04 |
| DE | 202009003176 | U1 | 7/2010 | |

(Continued)

OTHER PUBLICATIONS

International Search Report of PCT/EP2011/071826 mailed Feb. 28, 2012 with an English translation.
Written Opinion of the International Searching Authority of PCT/EP2011/071826.

*Primary Examiner* — Michael P Ferguson
(74) *Attorney, Agent, or Firm* — FisherBroyles, LLP; Robert Kinberg

(57) ABSTRACT

A fastener arrangement includes a main body that is made of a gas-tight and liquid-tight material to hold an object. The main body defines a cavity and is fixable to a support surface. A hydrophilic insert is attached to the main body inside of the cavity for facing the support surface and is adapted to receive a metered amount of moisture. An aerobic adhesive is applied to the hydrophilic insert so that the aerobic adhesive is encapsulated gas-tight and liquid-tight together with the hydrophilic insert in the cavity enclosed by the support surface and the main body when the main body is fixed on the support surface.

10 Claims, 3 Drawing Sheets

(56) References Cited

U.S. PATENT DOCUMENTS 8,545,647 B2 * 10/2013 Ash et al. .................. 156/60
8,721,831 B2 * 5/2014 Ronner .................. 156/276

FOREIGN PATENT DOCUMENTS

| WO | WO-03036106 A1 | 5/2003 |
| WO | WO-2009156013 A1 | 12/2009 |

* cited by examiner

FASTENER

CROSS-REFERENCE TO RELATED APPLICATIONS

This application is a U.S. National Stage of International Application No. PCT/EP2011/071826, filed Dec. 6, 2011, claiming priority from German Application No. DE 1020 100 56221.1, filed on Dec. 24, 2010.

BACKGROUND OF THE INVENTION

The invention relates to a fastener, comprising a main body composed of a gas-tight and liquid-tight material, which serves to hold an object and can be affixed with the aid of an adhesive to a support surface.

A fastener of this type which forms of a component of an assembly system is known from International Patent Publication No. WO 03/036106.

This assembly system is used for the locally fixed attaching of objects such as towel holders, shelves, light fixtures or similar equipment articles to a wall, a ceiling or a similar surface, in particular in rooms having walls coverings of tiles, marble slabs or the like. The assembly system consists of different types of fasteners and an adhesion or bonding agent, which can be an aerobic adhesive, wherein the shape of the fasteners must be adapted in dependence on the purpose. Systems of this type have the disadvantage of requiring extremely long curing times for the adhesive, which can last up to twelve hours, thereby considerably reducing the ease of installation of the systems. In cases where the environmental conditions are dry and cold, the adverse effects on the curing process can be particularly strong.

The fastener serves to receive an element that holds the object and comprises a main body which is provided at the back side facing the wall with a recess and a filling opening that empties into the latter. Adhesive and/or bonding agent is introduced via this opening into the space between the fastener and the wall.

The back side of the main body, which is facing the wall, is sufficiently liquid-permeable and gas permeable, at least in some regions, so that the gas that develops during the curing of the adhesive and bonding agent in the recess can escape and/or volatile bonding agents can evaporate and environmental air can simultaneously come into contact with this adhesive and bonding agent, thereby allowing a curing of the adhesive agent and ensuring a stable and load-bearing fixation of the fastener on the wall.

The disadvantage of the above described system is that the adhesive and bonding agent must always be in contact with environmental air via the gas-permeable and liquid-permeable wall of the main body to ensure a sufficient curing. As a result, the structural design options for the fastener are strongly restricted in an undesirable manner.

A fastening agent composed of a mixture of an aerobic adhesive and a hydrophilic substance is known from the International Patent Publication No. WO 2009/156013 A1. By adding the hydrophilic substance to the aerobic adhesive, a fastening agent mixture is formed which no longer requires surface contact with moist environmental air in order to cure from this surface inward. Rather, the hydrophilic substance dispersed in the aerobic adhesive that is contained in the mixture ensures that the aerobic adhesive in the mixture can cure from the inside out, even if there is no contact with the external environmental air containing the moisture. The moisture needed for the curing and/or the required oxygen are present in the hydrophilic substance itself since this substance contains enough moisture, owing to its hydrophilic characteristics, to meet the curing requirements for the mixture that forms the fastening agent.

With the fastening agent embodied in this way, an object can be secured easily on a support by applying a layer of the fastening agent between the object and the support.

When using the fastening agent, it is critical that the components are mixed together just prior to the use.

An assembly set is provided for this which contains two receptacles for the separate storage of the aerobic adhesive and the hydrophilic substance. The desired amounts of the components can then be removed from these receptacles for the mixing of the fastening agent, wherein a spatula is used for the mixing.

Following this, a layer of the fastening agent is applied to the object, and the object is subsequently affixed to the support surface by pressing the layer of fastening agent against the support surface. The aerobic adhesive in this layer thus cures as a result of the moisture contained in the hydrophilic substance.

SUMMARY OF THE INVENTION

It is an object of the present invention to create a fastener of the aforementioned type which is easy to handle and can be used flexibly while still having a high functionality.

The above and other objects are achieved according to the invention which provides, in one embodiment, a fastener arrangement, comprising: a main body, including a gas-tight and liquid-tight material, to hold an object, the main body defining a cavity and being fixable to a support surface; a hydrophilic insert attached to the main body inside of the cavity for facing the support surface and adapted to receive a metered amount of moisture; and an aerobic adhesive for application to the hydrophilic insert so that the aerobic adhesive is encapsulated gas-tight and liquid-tight together with the hydrophilic insert in the cavity enclosed by the support surface and the main body when the main body is fixed on the support surface.

With the fastener according to the invention, objects can be affixed securely to support surfaces, without requiring structural interventions involving screws or the like on the support surfaces or the objects.

An aspect of the invention lies in the interaction between the aerobic adhesive and the hydrophilic insert in the fastener. As a result of the contact between the aerobic adhesive and the hydrophilic insert to which moisture is supplied in a metered fashion, the aerobic adhesive can cure over its complete volume, without the necessity of coming into contact with the environmental air.

With the aid of this aerobic adhesive that interacts with the hydrophilic insert, a permanent, reliable and above all quickly available fastening of objects is made available, that is to say without the use of screws or similar mechanical fastening means.

An advantage, especially as compared to the fastening agent known from International Patent Publication No. WO 2009/156013 A1, is that mixing together an aerobic adhesive with a hydrophilic substance is no longer required. Rather, the mechanical contact alone between the aerobic adhesive and the hydrophilic insert, which occurs when the aerobic adhesive is applied to this hydrophilic insert, is sufficient to ensure a complete curing of the aerobic adhesive despite a completely gas-tight and liquid-tight encapsulation of the aerobic adhesive between the support surface and the main body of the fastener. A time consuming mixing of an aerobic adhesive with a hydrophilic substance is thus omitted, thereby making it considerably easier to assemble the fastener.

The ease of assembly is further increased in that the hydrophilic insert may be attached either with the aid of an adhesive agent or with a mechanical fastening device to the inside of the main body.

The main body and the hydrophilic insert consequently form a structural unit to which only the aerobic adhesive must be supplied in order to attach the fastener to the support surface.

A further advantage of the invention is that the aerobic adhesive and the hydrophilic insert are encapsulated gastight and fluid-tight in the cavity between the support surface and the main body. As a result, the curing process of the aerobic adhesive within the encapsulation occurs completely independent of the environmental conditions and is thus highly reproducible.

Depending on the climate conditions, the hydrophilic insert coming into contact with the environmental atmosphere might absorb either too much or too little moisture to ensure a defined curing process for the aerobic adhesive. These types of interfering influences are systematically removed by cutting off the aerobic adhesive from the environmental atmosphere and as a result of metering in the liquid prior to the use of the fastener.

It is advantageous if moisture is supplied in a metered fashion to the hydrophilic insert by guiding a wetted cloth over the insert. Moisture can thus be supplied easily and at the same time in a metered fashion.

According to one advantageous embodiment of the invention, the aerobic adhesive is composed of silane MS polymers.

The hydrophilic insert may be embodied as a plate-shaped insert that is composed of cotton or a composite fiber material.

Alternatively, the hydrophilic insert may be embodied in the form of a sintered plate, composed in particular of plastic, stainless steel or brass.

The hydrophilic insert can generally also consist of a hydrophilic coating, preferably composed of the aforementioned materials, wherein the hydrophilic coating is advantageously applied to an insert body or directly to the main body.

One structural embodiment of the fastener provides that the main body is provided with an edge segment that extends along its circumference and is raised, relative to the inside of a base plate for the main body, on which the hydrophilic insert rests.

The inside of the main body is thus recessed, with the hydrophilic insert placed into it and attached thereto. The cross-sectional surface of the hydrophilic insert may be adapted to the surface area on the inside, so that the hydrophilic insert is positioned essentially form-locking or tightly fitting in this recess.

A fixation ring may be fitted onto the edge segment forming the main body, by which the main body can be fixated ahead of time on the support surface. The fixation ring in particular consists of a double-sided adhesive tape.

The pre-fixation of the fastener facilitates its assembly since the fastener can thus be fixated ahead of time in the desired position on the support surface, meaning before the aerobic adhesive is applied to the hydrophilic insert and/or before the curing of the aerobic adhesive on the hydrophilic insert.

According to one embodiment, the base plate of the main body may be closed completely. In that case, the aerobic adhesive may be applied to the exposed top of the hydrophilic insert that is positioned in the main body before the fastener is fitted onto the aerobic insert.

According to a anther embodiment, the base plate and the hydrophilic insert attached to its inside may be punctuated by at least one bore hole, wherein aerobic adhesive can be inserted via this bore hole into the cavity between the main body and the support surface.

In that case, the fastener can be placed onto to the support surface prior to applying the aerobic adhesive and can be held in place thereon with the aid of the fixation ring. The aerobic adhesive can subsequently be pressed through the bore hole into the cavity between the main body and the support surface, so that the adhesive forms a homogeneous layer on the hydrophilic insert.

It may be advantageous if the base plate and the hydrophilic insert attached to its inside are punctuated by at least one bore hole through which excess aerobic adhesive can exit from the cavity between the main body and the support surface.

In those cases, some excess aerobic adhesive remains inside the bore holes and ensures an air-tight encapsulation of the aerobic adhesive on the inside which is in contact with the hydrophilic insert.

BRIEF DESCRIPTION OF THE DRAWINGS

In the following, the invention is explained with the aid of the drawings, wherein.

DETAILED DESCRIPTION OF THE INVENTION

Figure 1A:
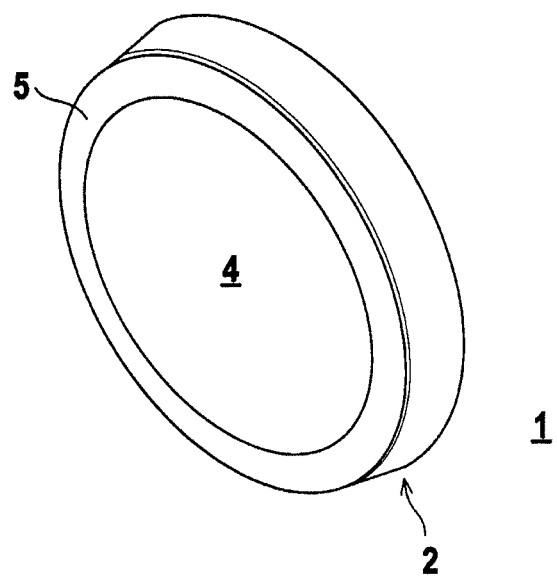
FIG. 1a is a view from above of the front of a first exemplary embodiment of the fastener according to the invention.
Figure 1B:
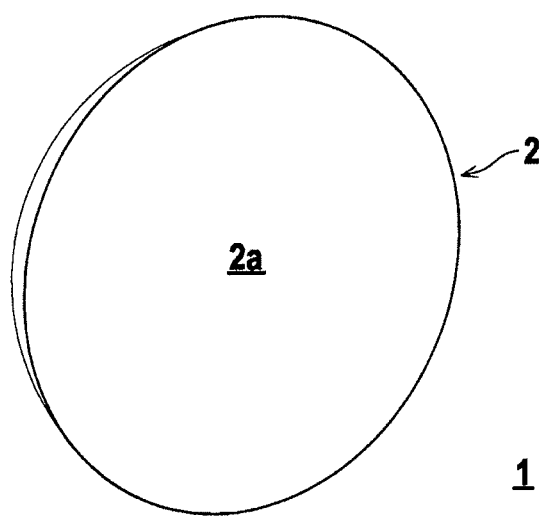
FIG. 1b is a view from above of the back side of a first exemplary embodiment of the fastener according to the invention.
Figure 1C:
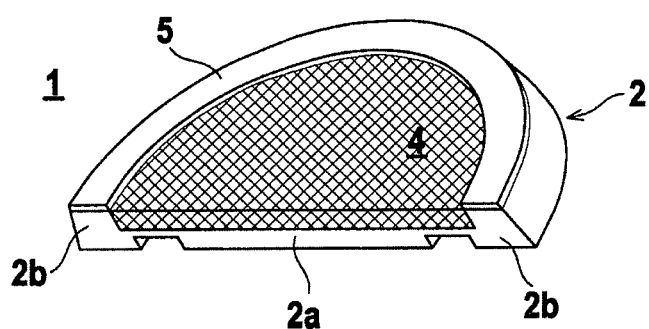
FIG. 1c is a sectional view through the fastener as shown in FIGS. 1a and 1b.

FIGS. 1a to 1c show a first exemplary embodiment of the fastener 1 according to the invention. In this embodiment, the fastener 1 comprises a main body 2 of which the front is shown in FIG. 1a and the back in FIG. 1b. FIG. 1c shows a sectional view through the fastener 1. The main body 2 consists of a solid, gas-tight and liquid-tight material, in particular a metal such as aluminum.

The main body 2 has a circular disc shape and is completely closed in the present case. Bolts, threads or similar adapters, which are not shown herein, can be provided on the back side of the main body 2 in order to position and fixate specific objects on the fastener 1. The fastener 1 embodied in this way can be used in particular for holding accessories in bathrooms, sanitary rooms or also to secure objects to the inside or the outside of buildings, for example such objects as grates for holding plants, curtain rods, shower profiles and the like.

The main body 2 in the present case consists of a circular disk-shaped base plate 2a, wherein a ring-shaped edge segment 2b which projects over the inside the base plate is provided on the inside along the circumference of the base plate. The inside of the base plate 2a is therefore recessed, relative to the edge segment 2b.

A hydrophilic insert 4 is inserted into this recessed area and is fixated therein. The fixation can be realized as mechanical fixation or in the form of an adhesive agent. The hydrophilic insert 4 can take the form of a plate-shaped insert composed of cotton or a composite fiber material. Alternatively, the hydrophilic insert 4 can also be a sintered plate composed, for example, of plastic, stainless steel or brass.

The hydrophilic insert 4 is embodied plate shaped, wherein its geometries are adapted to the main body 2 in such a way that the hydrophilic insert 4 extends over the complete inside area of the base plate 2a and fits tightly against the edge segment 2b of the main body 2. Alternatively, the hydrophilic insert 4 can also extend only over partial areas of the base plate 2a.

The thickness of the material for the hydrophilic insert 4 is selected such that the insert is positioned lower, relative to the upper edge of the edge segment 2b.

It is obvious from FIGS. 1a and 1c that a fixation ring 5 is fitted onto the upper edge of the edge segment 2b and extends over the complete circumference of the edge segment 2b. The fixation ring 5 is used to pre-position the fastener 1 on a support surface, not shown herein, to which the fastener 1 is to be attached. The fixation ring 5 advantageously consists of a double-sided adhesive tape.

To permanently install the fastener 1 on a support surface, for example on the wall or ceiling of a building, moisture is first metered into the hydrophilic insert 4, for example by swiping a moistened cloth over the hydrophilic insert 4. A layer of aerobic adhesive is then applied to this moistened hydrophilic insert 4. The aerobic adhesive may be composed of a silane MS polymer. Following this, the main body 2 of the fastener 1 is placed onto the support surface, so that the fixation ring 5 comes in contact with the support surface and the desired pre-positioning is achieved. As a result, the aerobic adhesive is located inside a completely enclosed cavity formed by the support surface and the main body 2. Despite the gas-tight and air-tight encapsulation of the aerobic adhesive, this adhesive cures completely since it is supplied by the hydrophilic insert 4 with the necessary moisture for the curing process. Owing to the metered-in supply of moisture to the hydrophilic insert 4, the aerobic adhesive is provided with precisely the amount of moisture needed for a complete curing. As a result of the gas-tight and liquid-tight encapsulation, the aerobic adhesive is protected against environmental influences, in particular against fluctuations in the humidity of the air which, upon contact with the aerobic adhesive, could result in too much or too little moisture being supplied to the aerobic adhesive, thereby possibly causing an incomplete curing of the aerobic adhesive. Since a complete curing of the aerobic adhesive is achieved through the encapsulation of the aerobic adhesive and its contact with the moistened hydrophilic insert 4, an excellent, permanent adherence of the fastener 1 on the support surface is achieved.

Figure 2A:
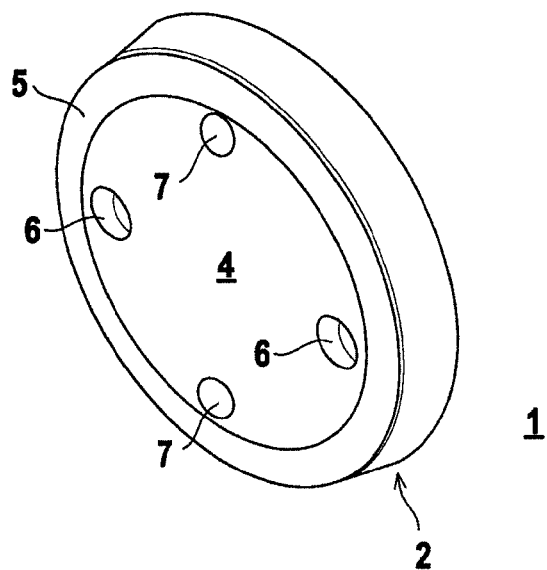
FIG. 2a is a view from above of the front of a second exemplary embodiment of the fastener according to the invention.
Figure 2B:
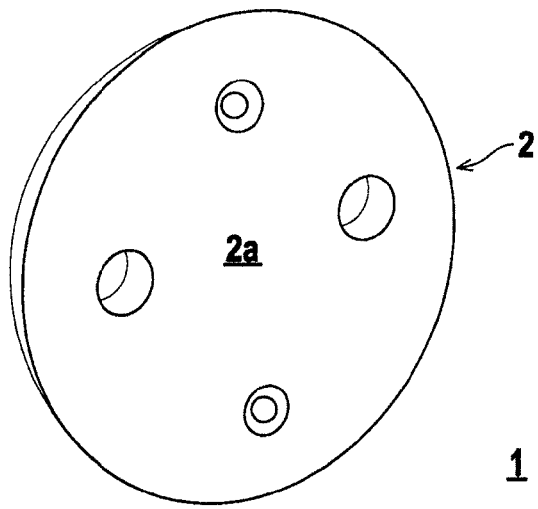
FIG. 2b is a view from above of the back side of a second exemplary embodiment of the fastener according to the invention.
Figure 2C:
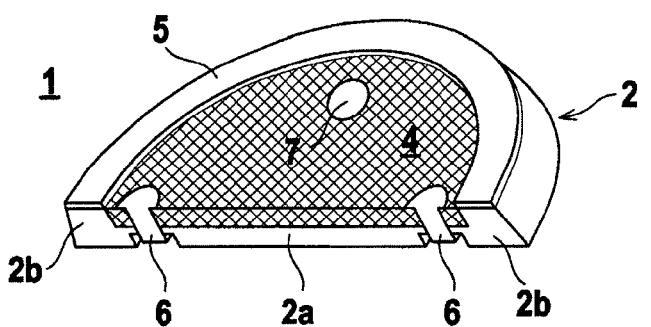
FIG. 2c is a sectional view through the fastener as shown in FIGS. 2a and 2b.

FIGS. 2a to 2c show a variant of the embodiment according to FIGS. 1a to 1c. The embodiment according to FIGS. 2a to 2c is provided with bore holes 6, 7 which punctuate the base plate 2a and also the hydrophilic insert 4 attached to it. Otherwise, the embodiment shown in FIGS. 2a to 2c corresponds fully to the embodiment shown in FIGS. 1a to 1c.

With the exemplary embodiment shown in FIGS. 2a to 2c, the hydrophilic insert 4 is initially provided with moisture in a metered fashion. In contrast to the exemplary embodiment according to FIGS. 1a to 1c, the fastener 1 shown herein can be pre-fixated 5 on the support surface with the aid of the fixation ring 5, prior to applying the aerobic adhesive to the hydrophilic insert 4. In the present case where the fastener 1 is pre-fixated on the support surface, aerobic adhesive is inserted via one or both bore holes 6 into the cavity between the main body 2 and the support surface. The aerobic adhesive inserted in this way then forms an adhesive layer between the support surface and the hydrophilic insert 4. Excessive aerobic adhesive can exit via the bore holes 7. Residual aerobic adhesive inside the bore holes 6, 7 seals these bore holes 6, 7 so that the layer of aerobic adhesive between the support surface and the hydrophilic insert is again encapsulated gas-tight and liquid-tight, in the same way as for the embodiment according to FIGS. 1a to 1c. A controlled and complete curing of the layer of aerobic adhesive between the support surface and the hydrophilic insert 4 is consequently also achieved in this case since the aerobic adhesive therein contains only metered-in moisture from the hydrophilic insert but not from the environmental atmosphere.

The bore holes 6, 7 can furthermore meet the additional function of serving as mechanical fixation for the hydrophilic insert 4 in the main body 2, wherein the bore holes 6, 7 in particular are used for installing rivet connections.

Figure 3:
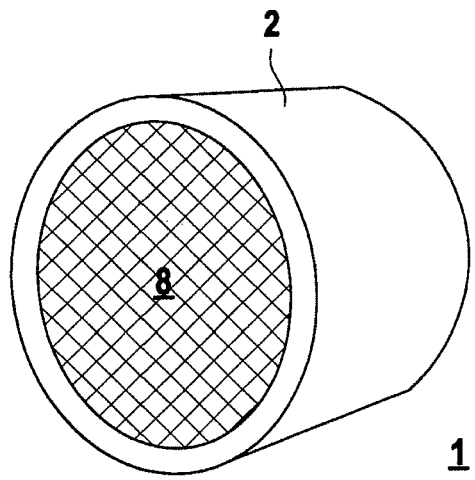
FIG. 3 shows a fastener comprising a magnetic holder.

FIG. 3 shows an embodiment of a fastener 1 with a magnetic holder. The fastener 1 in this case has a hollow-cylindrical main body 2. FIG. 3 shows a view of the exposed top of the main body 2. A magnet 8 is positioned somewhat recessed in the main body 2, in such a way that it is freely accessible via the exposed top of the main body 2. According to the embodiment shown in FIGS. 1a to 1c, the hydrophilic insert 4 is located on the underside of the main body 2. By applying aerobic adhesive to the hydrophilic insert 4, the fastener 1 embodied in this way can be installed on a support surface.

Figure 4:
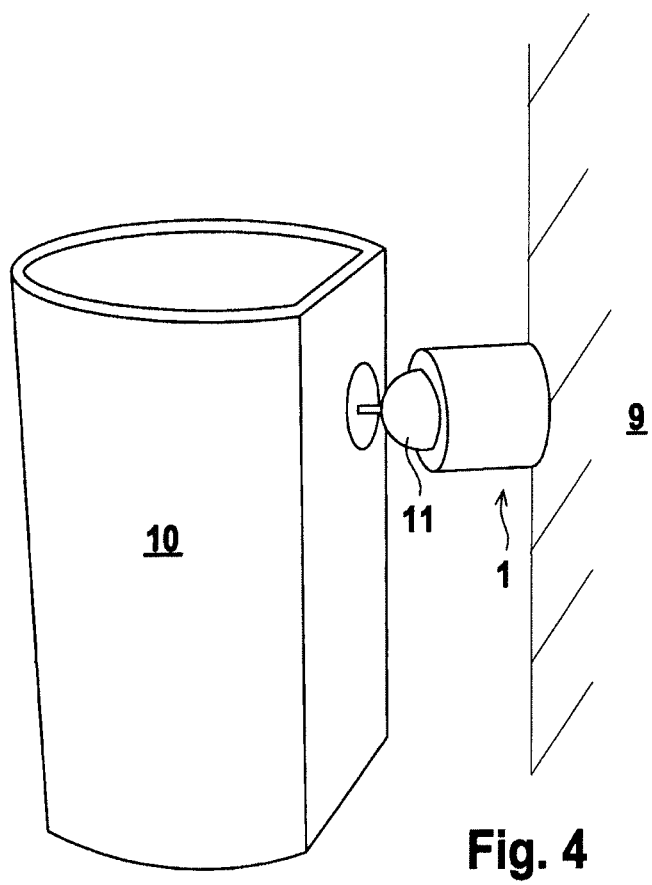
FIG. 4 shows an application example for the fastener according to FIG. 3.

FIG. 4 shows an application example for the fastener 1 according to FIG. 3. The fastener 1 is attached to a wall element 9 with the aid of aerobic adhesive that is applied to the hydrophilic insert 4, for example used inside a motor vehicle. A refuse container 10 is provided with a ball joint on its outer wall. The metal ball 11 of the ball joint is inserted into the exposed top of the fastener 1 and is held in place therein by the magnetic forces of the magnet 8. As a result, the refuse container is attached pivoting on the fastener 1.

The invention claimed is:

1. A fastener arrangement, comprising:
   a main body, formed of a gas-tight and liquid-tight material, and having a back side adapted to hold an object and a front side having a cavity defined therein and being fixable to a support surface, wherein the main body comprises a base plate having a circumference and an edge segment extending along the entire circumference which is raised, relative to an inside of the base plate to define the cavity, wherein the cavity and the base plate of the main body are closed completely in a gas-tight and liquid-tight manner when the edge segment abuts the support surface;
   a hydrophilic insert, comprised of a fibrous or sintered material, attached to the main body, resting on the base plate, inside of the cavity, an exposed surface of the hydrophilic insert facing the support surface and receiving a metered amount of moisture; and an aerobic adhesive applied to the exposed surface of the hydrophilic insert previously moistened with the metered amount of moisture so that the aerobic adhesive completely cures while encapsulated, gas-tight and liquid-tight, together with the hydrophilic insert in the cavity enclosed by the support surface and the main body when the main body is fixed on the support surface.

2. The fastener arrangement according to claim 1, wherein the aerobic adhesive comprises silane MS polymers.

3. The fastener arrangement according to claim 1, wherein the hydrophilic insert includes a plate-shaped insert comprised of cotton or a composite fiber material.

4. The fastener arrangement according to claim 1, wherein the hydrophilic insert comprises a sintered plate that includes one of plastic, stainless steel or brass.

5. The fastener arrangement according to claim 1, wherein the hydrophilic insert comprises a hydrophilic coating on an insert body.

6. The fastener arrangement according to claim 1, further comprising a fixation ring adapted to be fitted onto the edge segment of the main body by which the main body is fixable ahead of time to the support surface.

7. The fastener arrangement according to claim 6, wherein the fixation ring comprises a double-sided adhesive tape.

8. The fastener arrangement according to claim 1, wherein the hydrophilic insert is attached with one of an adhesive or a mechanical fastener to an inside of the main body.

9. The fastener arrangement according to claim 1, wherein moisture is supplied in a metered fashion to the hydrophilic insert by sliding a moistened cloth across the insert.

10. The fastener arrangement according to claim 1, further including a magnetic base in the main body and constituting an adapter for a pivoting joint.

* * * * *